United States Patent
Beaven et al.

(10) Patent No.: US 6,865,541 B1
(45) Date of Patent: Mar. 8, 2005

(54) REPLACEABLE OUTCOME DECIDER

(75) Inventors: John Anthony Beaven, Romsey (GB); Amanda Elizabeth Chessell, Alton (GB); Catherine Griffin, Romsey (GB); Iain Stuart Caldwell Houston, Sherborne (GB); Martin Mulholland, Winchester (GB); Ian Robinson, Swanmore (GB); David John Vines, Romsey (GB)

(73) Assignee: International Business Machines Corporation, Armonk, NY (US)

( * ) Notice: Subject to any disclaimer, the term of this patent is extended or adjusted under 35 U.S.C. 154(b) by 677 days.

(21) Appl. No.: 09/442,888

(22) Filed: Nov. 18, 1999

(51) Int. Cl.⁷ .............................. G06F 17/60
(52) U.S. Cl. ............ 705/9; 705/1; 705/7; 705/8; 705/10
(58) Field of Search .................. 705/1, 7–10

(56) References Cited

U.S. PATENT DOCUMENTS

| | | | | |
|---|---|---|---|---|
| 5,560,007 A | * | 9/1996 | Thai | 707/3 |
| 5,608,720 A | * | 3/1997 | Biegel et al. | 370/249 |
| 5,737,536 A | * | 4/1998 | Herrmann et al. | 709/229 |

FOREIGN PATENT DOCUMENTS

JP          408095805 A    *   4/1996   ............. G06F/9/46

OTHER PUBLICATIONS

Intel 80386 Reference Programmer's Manual: Chapter 7 Multitasking. http://www7.informatik.uni-erlangen.de/~mosdoerfe/embedded/386html/c07.htm.*

* cited by examiner

Primary Examiner—James P. Trammell
Assistant Examiner—James A. Reagan
(74) Attorney, Agent, or Firm—Gregory M. Doudnikoff

(57) ABSTRACT

Disclosed is data processing apparatus comprising: means for receiving inputs indicative of results from one or more participants of said one or more sets of data processing tasks; means for mapping each of said inputs to a corresponding mapped value by accessing a mapping table; outcome processor means for accepting the mapped values as inputs and determining an outcome for said one or more sets of data processing tasks; and means, responsive to said means for determining, for transmitting an indicator of said outcome to said one or more participants; wherein the inputs and mapped values of the mapping table are programmably changeable to thus provide a high degree of flexibility with respect to said inputs.

13 Claims, 4 Drawing Sheets

REPLACEABLE OUTCOME DECIDER

RELATED APPLICATIONS

The present invention is related to the U.S. patent application 09/442,788, entitled "An Extended Transaction Processor For Pre-Completion Transaction Termination", filed on the same day as this application.

FIELD OF THE INVENTION

This invention relates to the field of data processing, and more particularly to data processing in a component-based business processing environment.

BACKGROUND OF THE INVENTION

In a component-based business data processing environment, there are typically mixtures of transactional and non-transactional data processing activities in a system at any one time. These transactional and non-transactional activities may have complex relationships and interdependencies, and the management of these relationships and interdependencies is difficult and time-consuming for the system designer and programmer.

The term "transactional" is used in the field of data processing to refer to the processing of a piece of data processing work that may be characterised as having a necessary unity. For example, the data processing task of processing a cash withdrawal from an automated teller machine has several elements, but all must take place for the transaction to be completed. The user's identity must be verified, the cash must be issued, and the user's account must be updated to reflect the new balance after the withdrawal, and so on. If the machine runs out of cash or suffers some other failure, so that the withdrawal does not take place, the user's account must not be updated, or, if it has already been updated before the point of failure, the update must be cancelled so that the account returns to its previous state.

Thus, in the field of transaction processing, transactions are generally required to have what are known as the ACID properties. ACID is an acronym representing the four transaction properties of: Atomicity, Consistency, Isolation and Durability. Atomicity requires that all the operations of the transaction must occur or none must occur. Consistency requires a transaction to maintain the consistency of the database. Isolation requires a transaction not to read the intermediate results of another transaction. Durability requires the results of a committed transaction to be made permanent. For background information on the ACID properties, see *Transaction Processing: Concepts and Techniques*, J. Gray and A. Reuter.

In a conventional transaction having the ACID properties, the outcome of the transaction (whether it is committed or rolled back) is determined by collecting a set of "votes" or requests from the application using the transaction and the resources (or the resource-owning applications) that are involved in the transaction. In conventional transaction processing environments, these functions are managed by a syncpoint (synchronization point) manager or a recovery manager: a specialised program element designed to gather the "votes" or requests of the participants in the transaction and to act upon them according to some fixed, system- or application-wide rule. This function is clearly limited in that the choices available may be characterized as "go or no-go", commit or rollback. This is appropriate in the unitary ACID transaction environment.

Clearly, however, there exist more complex business environments requiring characteristics other than those of this simple, unitary transaction model, and these are the subject of continuing study and research. For background information on more complex transaction environments, see *Database Transaction Models*, Ahmed K. Elmagarmid, ed., and *Advanced Transaction Models and Architectures*, Jajodia and Kerschberg, eds. Examples taken from real life include, for example, the booking of a vacation, which may involve multiple transactions to book flights and hire cars, reserve hotel rooms, and so on. In such cases, the simple model of a transaction that either works completely or fails completely may not be the best model. It may be more desirable to have some flexibility within the transaction semantics to permit partial successes and failures, to continue one provisional booking while reversing-out another, and so on. At the same time, if such an extended transaction is likely to take a long time to process, it is not appropriate that the transaction should hold the resource locks that are used to maintain data integrity for that long processing time.

In implementing such "nested" transaction structures, the resources also require some form of provisional decision from the transaction user application and from any nested transactions, before they determine their "votes" to contribute to a final outcome.

Large enterprise applications implemented using an Online Transaction Processing (OLTP) system typically use a number of individual ACID transactions to implement a function that the business regards as a complex, but coherent update to business data. It is not possible simply to implement the business transaction as a single ACID transaction because of data and resource sharing requirements in the OLTP environment. Within such a structure, there is still some equivalent of the syncpoint or recovery manager of the conventional environment. Its capabilities, however, must be extended to permit more flexible processing than is allowed for by the simple "commit or rollback" model of the conventional environment.

A further layer of difficulty in managing transactions is created as the trend continues towards the automated deployment of flexible data-processing components in response to high-level abstract models of business processes. One such environment is that described in *Enterprise Java Beans Technology*, by Anne Thomas (published by Patricia Seybold Group). In such an environment, the degree of abstraction of the process of combining flexible components into a real-world runtime information processing system renders the problem of the detailed control of individual transactions and transaction elements, with all their relationships with heterogeneous resources, extremely difficult.

Thus, in a traditional ACID transaction, the outcome of the transaction (whether the transaction is committed or rolled-back) is determined by collecting a set of votes or requests from the user of the transaction and the resources involved in that transaction. The rule for determining the overall outcome in a traditional ACID transaction is fixed. Once the outcome is decided all the resources and the user of the transaction are informed of the outcome. The fixed nature of this structure is an inhibitor to the development of more flexible environments that reflect real-world processing possibilities.

SUMMARY OF THE INVENTION

Accordingly, in a first aspect, the present invention provides apparatus for processing one or more sets of data processing tasks, said apparatus comprising: means for receiving inputs indicative of results from one or more participants of said one or more sets of data processing tasks; means for mapping each of said inputs to a corresponding mapped value by accessing a mapping table; outcome processor means for accepting the mapped values as inputs and determining an outcome for said one or more sets of data processing tasks; and means, responsive to said means for determining, for transmitting an indicator of said outcome to said one or more participants; wherein the inputs and mapped values of the mapping table are programmably changeable to thus provide a high degree of flexibility with respect to said inputs.

The apparatus is preferably further characterized in that said outcome processor means is programmably changeable to thus provide a high degree of flexibility with respect to the processing of the mapped values.

The apparatus is preferably further characterized in that said inputs comprise requests by said one or more participants to transmit a determined indicator of said outcome.

The apparatus is preferably further characterized in that said data processing tasks include both transactional and non-transactional tasks.

The apparatus is preferably further characterized in that said inputs comprise: commit requests; and rollback requests.

The apparatus is preferably further characterized in that said means for determining comprises means for evaluating Boolean expressions.

The apparatus is preferably further characterized in that said means for determining comprises means for accumulating counts.

In a second aspect, the present invention provides a method for processing one or more sets of data processing tasks, said method comprising the steps of: receiving inputs indicative of results from one or more participants of said one or more sets of data processing tasks; mapping each of said inputs to a corresponding mapped value by accessing a mapping table; accepting the mapped values as inputs; determining an outcome for said one or more sets of data processing tasks; and transmitting an indicator of said outcome to said one or more participants; wherein the inputs and mapped values of the mapping table are programmably changeable to thus provide a high degree of flexibility with respect to said inputs.

The method of the second aspect is preferably further characterized in that said inputs comprise requests by said one or more participants to transmit a determined indicator of said outcome.

The method of the second aspect is preferably further characterized in that said inputs comprise: commit requests; and rollback requests.

The method of the second aspect is preferably further characterized in that said step of determining comprises evaluating Boolean expressions.

The method of the second aspect is preferably further characterized in that said step of determining comprises accumulating counts.

In a third aspect the present invention provides a computer program for processing one or more sets of data processing tasks, said computer program comprising computer program instructions for causing a computer to carry out the steps of a method according to the second aspect of the invention.

The present invention, as it might be used in a transactional environment, advantageously allows the user of the transaction to propose a vote of 'commit' or 'rollback' and the resources to vote 'commit', 'rollback' or 'readonly'. The outcome decider then deduces the overall outcome as 'rollback' if any participant votes "rollback"; otherwise the outcome is 'commit'.

Clearly, however, not all the components that are participants in a data-processing activity need to be transactional. It is thus clear to one skilled in the art that heterogeneous components may provide varied inputs to an outcome decider of the present invention for many purposes other than just that of determining the "commit-or-rollback" of a conventional transaction. The outcome decider may for example accept input that indicates that a particular activity failed, but this may need to be interpreted in a particular case as a "positive" request to the outcome decider. Similarly, an indication that a particular activity or type of activity did nothing (that is, caused no change in the state of the system) may be interpreted as a positive request.

An advantageous extension to the conventional ACID transaction is to allow a transaction to have a much wider range of outcomes, typically by allowing the user and the resources of the transaction to select from a much wider, range of outcomes and then "plugging-in" an outcome decider capable of determining an appropriate outcome.

Additionally, the coordinator of an extended transaction can be designed to allow the outcome decider: to be 'pluggable', that is, to be chosen by the user of the transaction. This advantageously allows the user of the; extended transaction to provide an arbitrary set of outcomes and allow the outcome of the extended transaction to be determined from amongst these arbitrary outcomes.

If nested transactions are used, an extension of the pluggable outcome decider can advantageously be used by a coordinator to determine the overall outcome based on the user of the transaction, the resources of the transaction and the outcomes of the nested transactions.

Similarly, a pluggable outcome decider may advantageously be used to implement a new and more flexible version of the two-phase commit processing that is typical of modern transactional systems.

Clearly, those skilled in the art will see that there are many further advantages and possible implementations, in both hardware and software, for the functions of the present invention. In one example, in a Java implementation, the pluggable outcome decider can be implemented by means of an interface class. In a further example for use where two-phase commit is required, a Java interface class comprising two methods could be passed to an extended transaction coordinator. A first method would determine a provisional outcome according to the "votes" from a transactional user application and any nested transactions, while a second method would determine the overall outcome based on the provisional outcome and the "votes" from the participating resources.

By providing the means for sets of outcome decider components to be created and deployed within the system, the present invention advantageously reduces the burden of low-level programming required to manage the relationships among heterogeneous components, especially in cases where components represent products produced by various suppliers with differing standards and interfaces.

BRIEF DESCRIPTION OF THE DRAWINGS

A preferred embodiment of the present invention will now be described by way of example, with reference to the drawings in which.

DETAILED DESCRIPTION OF A PREFERRED EMBODIMENT

Figure 1:
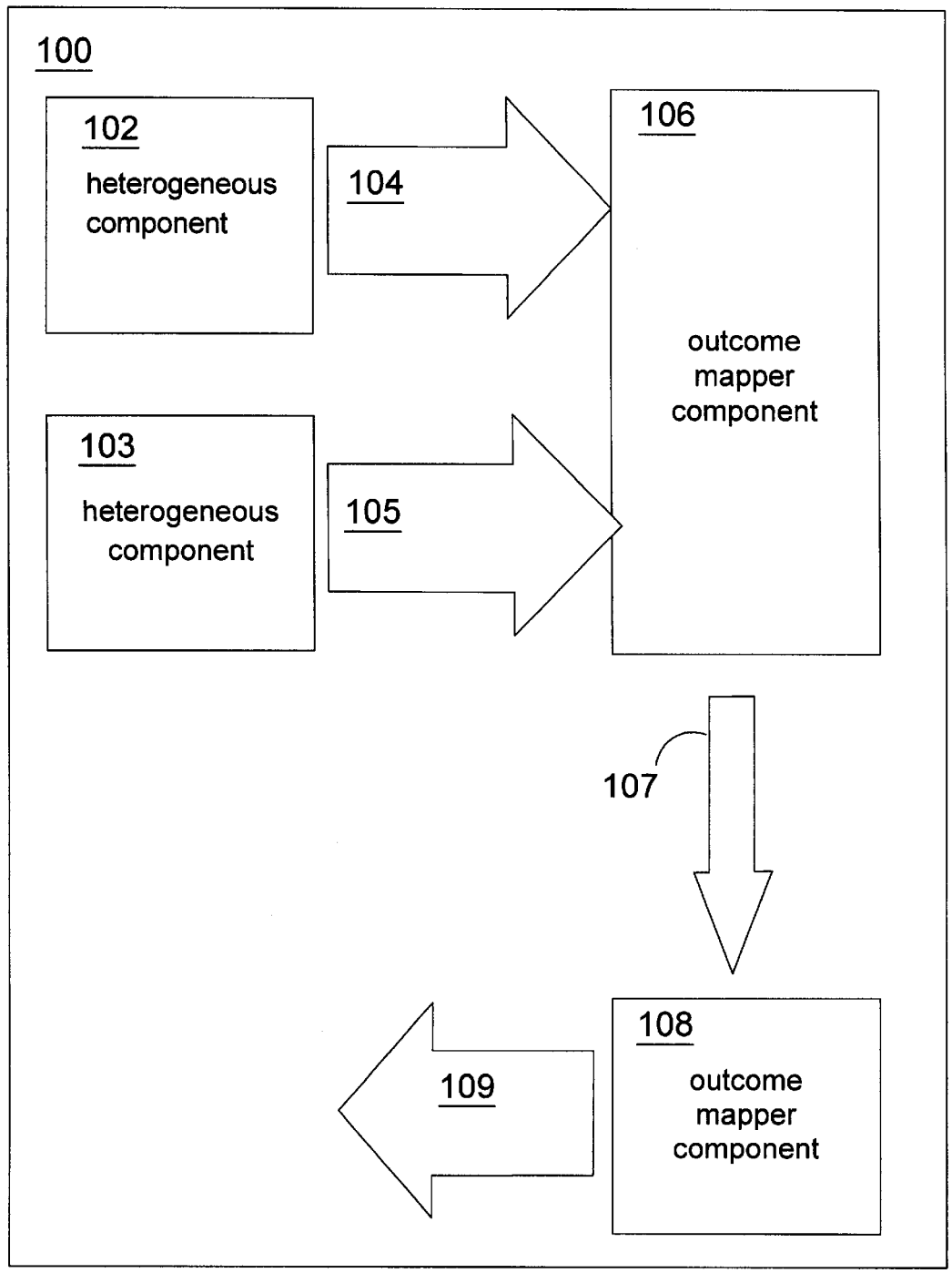
FIG. 1 shows a simple data processing system of a preferred embodiment.

FIG. 1 shows a data processing system comprising heterogeneous participating components (102, 103). In this example, only two components are shown for the sake of simplicity; clearly, many more components may exist in any similar real-world system. Components (102, 103) may be system-supplied components, or they may be user application components. The components may be transactional or non-transactional. Components (102, 103) provide inputs (104, 105) to an outcome mapper component (106). Outcome mapper component (106) in turn provides mapped inputs (107) to an outcome processor component (108). Outcome processor component processes inputs (107) according to a predetermined process and transmits the processed outcome (109) for use by the data processing system (100). The use of the outcome (109) by data processing system (100) may be entirely conventional; it is not relevant to the present discussion, and will not be further described here.

Figure 2:
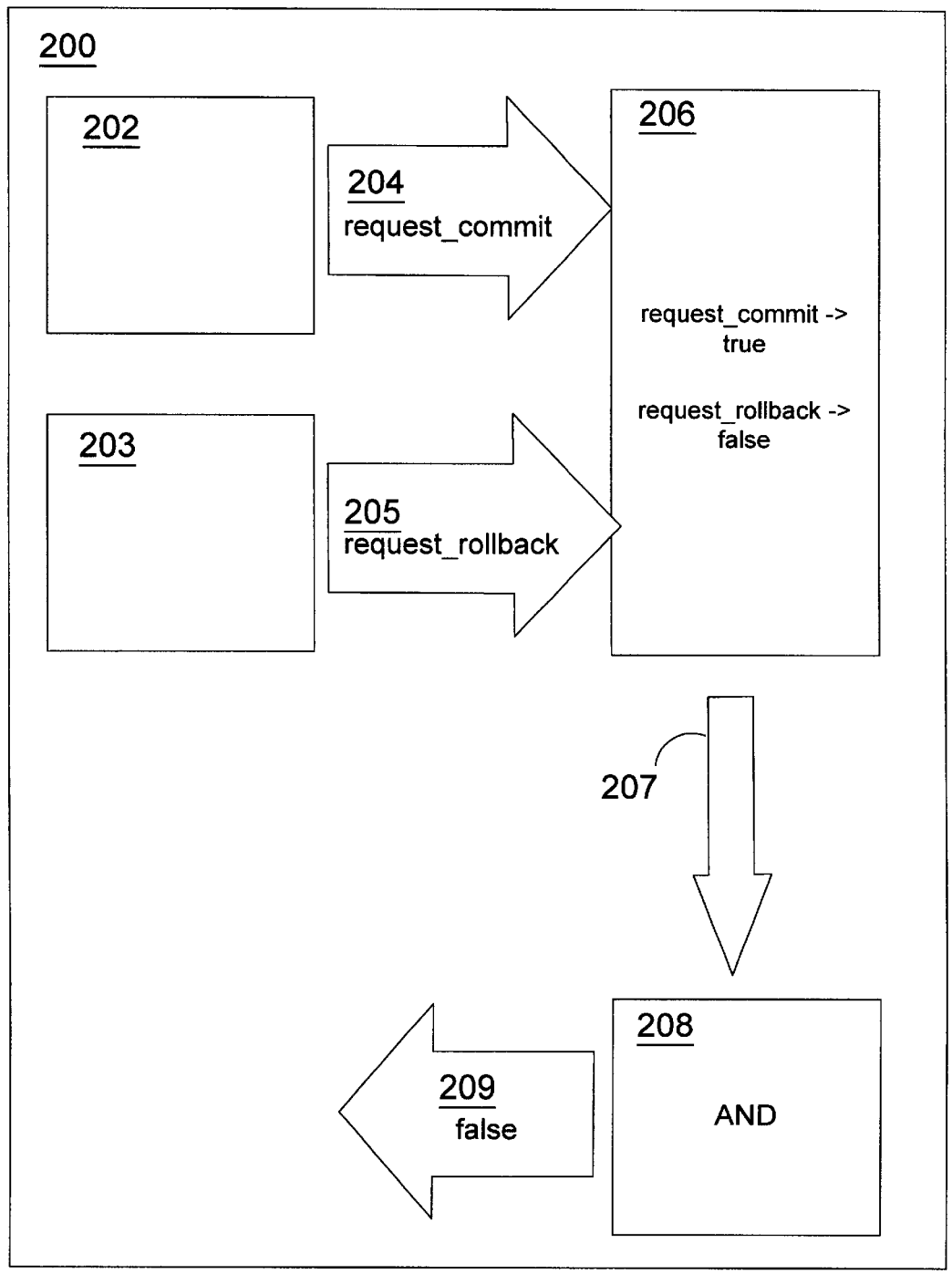
FIG. 2 shows a data processing system of a preferred embodiment with exemplary requests, processing and results.

In FIG. 2, the input (204) from component (202) takes the form of a typical transaction processing command "request_commit", while for component (203), the input (205) is a "request_rollback" command. The values provided by components (203, 204) are accepted as inputs (204, 205) by the outcome mapper component (206), where each of inputs (204, 205) is mapped according to a predetermined mapping.

In this example, the inputs are mapped onto a two-value system, giving results as either "true" or "false". Clearly, there is no requirement that the system be two-valued. Indeed, in many transactional environments, there is a need to distinguish three input values from components: request_commit, request_rollback, and readonly. "Readonly" is used by a component to indicate that it has updated no resources, and therefore need not be taken into account in determining whether to commit or roll-back resource updates made by the other participating components.

In an alternative, the outcome mapper component (206) may map inputs from, for example, "request_commit" and "request_rollback" or "true" and "false" into numeric values, which can be subsequently accumulated by the outcome processor component (208) and transmitted as an outcome (209) comprising a numeric count. This would make it possible to operate a majority-voting outcome decision system, or a system requiring a threshold level of participant inputs to be exceeded.

In any case, as shown in FIG. 2, a simple case is that component (202) provides an input (204) of "request_commit", and component (203) provides an input (205) of "request_rollback". Outcome mapper (206) maps the "request_commit" input (204) to a value of "true" and the "request_rollback" input (205) to a value of "false". These values are then provided as input (207) to outcome processor (208), which applies, in this exemplary embodiment, a Boolean logical AND operation. The result of "true AND false" is "false", and therefore outcome processor (208) provides an outcome of "false" to data processing system (200).

In a conventional transactional system, the combination "request_commit" and "request_rollback" would typically be processed as an inevitable "rollback" decision. As is clear from FIGS. 1 and 2, this is not the case with the outcome decider of the preferred embodiment, in which outcome mapper (206) may be provided with a very flexible set of mapping rules to accept inputs in a multiplicity of forms and to map them onto a system having a set of comparable forms, and where outcome processor (208) may be provided with a flexible set of processing rules for processing the mapped values with which it has been supplied. As a simple example, the outcome processor (208) of a system in which one and only one of components (202, 203) must succeed might be instructed to apply a Boolean logical XOR (exclusive OR) to the supplied values in the input (207). In such a case, because the result of "true XOR false" is "true", outcome (209) would be "true", correctly indicating that one and only one of components (202, 203) has succeeded.

Figure 3:
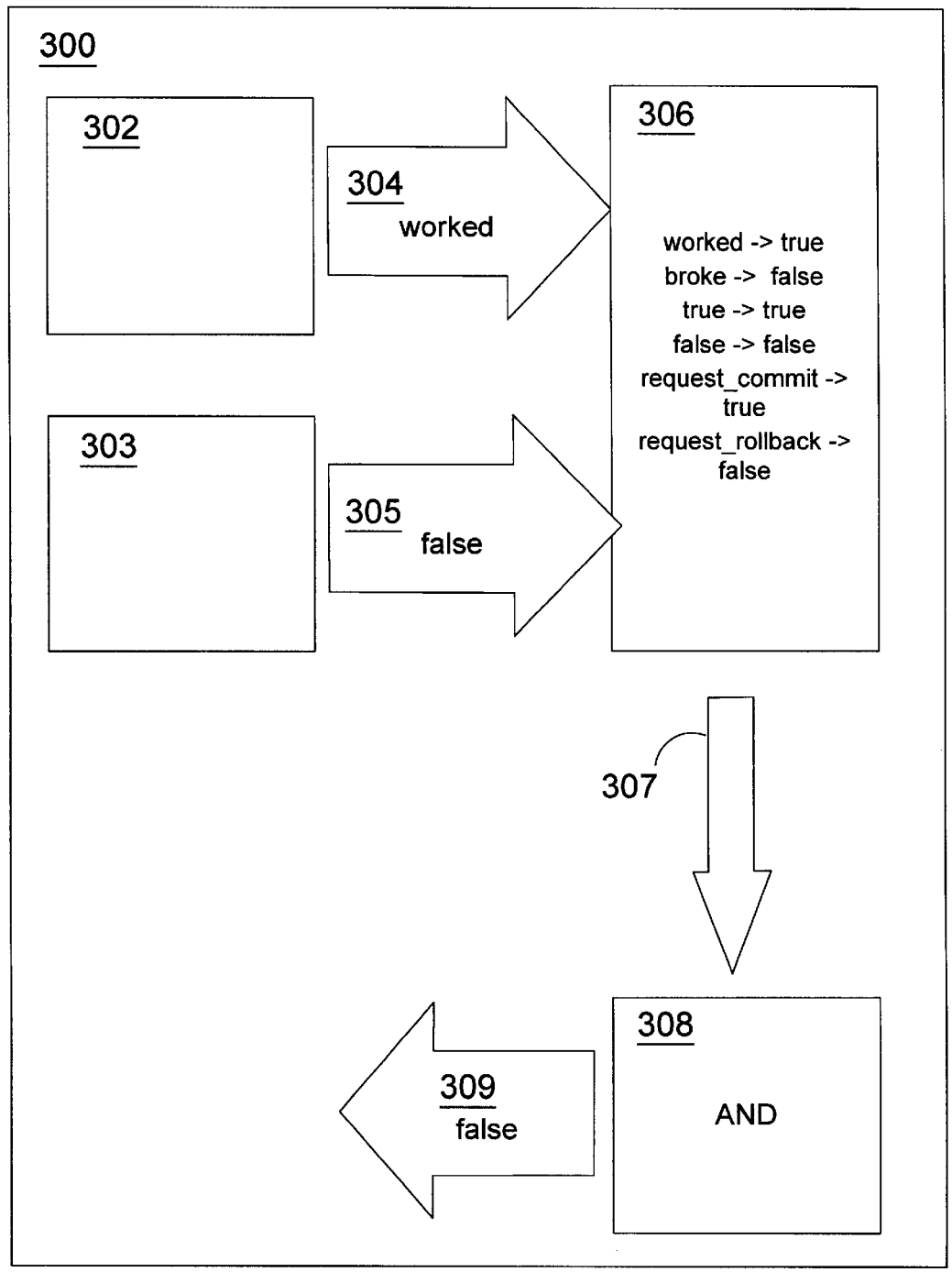
FIG. 3 shows a data processing system of a preferred embodiment with exemplary requests, processing and results, with some examples showing the extensibility of the mappings and outcomes available to a system of a preferred embodiment.

In FIG. 3, components (302, 303) provide values of "worked" and "false" as inputs (304) and (305), respectively. An advantage of a system according to a preferred embodiment of the present invention is precisely that the values need not be of any particular type, provided that outcome mapper (306) has an appropriate mapping rule to map the values to its set of comparable values. Outcome mapper (306) in this figure has mappings for "worked", "broke", "true", "false", "request_commit", and "request_rollback". Those skilled in the art will recognize that these represent only a small subset of the possible values, and that the mapping onto a "true or false" system of values is also used here for the sake of simplicity and clarity. It may be required to provide mappings for further values.

Figure 4:
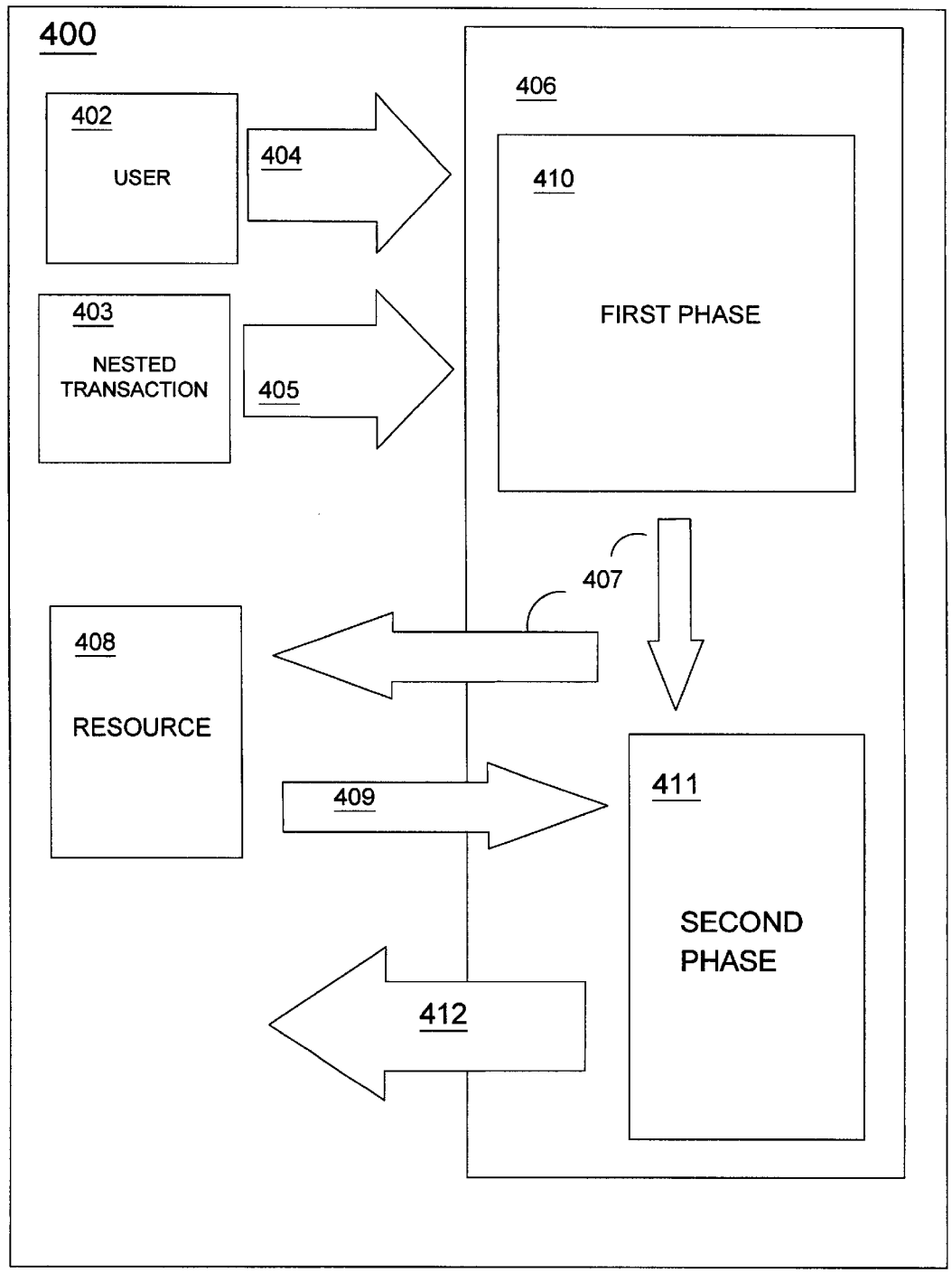
FIG. 4 shows a data processing system of an alternative embodiment capable of two-phase commit processing.

In FIG. 4, the data processing system (400) comprises a transactional "user" application, hereafter referred to as user (402), a nested transaction (403), and a participating resource (408). User (402) and nested transaction (403) provide inputs (404) and (405) respectively to a first phase component (410) of transaction coordinator (406). The first phase component (410) outputs a provisional outcome (407) which is accepted as input to a resource (408). Resource (408) responds to the provisional outcome (407) and its information concerning the resource state to supply resource outcome (409), which is in turn accepted as input to a second phase component (411) of transaction coordinator (406). Transaction coordinator (406) responds by processing the combination of provisional outcome (407) and resource outcome (409) to produce final outcome (412), which it transmits to data processing system (400). A similar pattern of processing may also be applied to commit processing having more than two phases, by iterating the provisional outcome processing step of the present preferred embodiment as many times as necessary.

What is claimed is:

1. Apparatus for processing one or more sets of data processing tasks, said apparatus comprising:

means for receiving inputs indicative of results from one or more participating components of said one or more sets of data processing tasks;

means for mapping each of said inputs to a corresponding mapped value by accessing a mapping table;

outcome processor means for accepting the mapped values as inputs and determining an outcome for said one or more sets of data processing tasks; and means, responsive to said means for determining, for transmitting an indicator of said outcome to said one or more participating components;

wherein the inputs and mapped values of the mapping table are programmably changeable to thus provide a high degree of flexibility with respect to said inputs.

2. Apparatus as claimed in claim 1, further characterized in that said outcome processor means is programmably changeable to thus provide a high degree of flexibility with respect to the processing of the mapped values.

3. Apparatus as claimed in claim 1, further characterized in that said inputs comprise requests by said one or more participating components to transmit a determined indicator of said outcome.

4. Apparatus as claimed in claim 1, further characterized in that said data processing tasks include both transactional and non-transactional tasks.

5. Apparatus as claimed in claim 1, further characterized in that said inputs comprise:

commit requests; and rollback requests.

6. Apparatus as claimed claim 1, further characterized in that said means for determining comprises means for evaluating Boolean expressions.

7. Apparatus as claimed in claim 1, further characterized in that said means for determining comprises means for accumulating counts.

8. A method for processing one or more sets of data processing tasks, said method comprising the steps of:

receiving first inputs indicative of results from one or more participating components of said one or more sets of data processing tasks;

mapping each of said inputs to a corresponding mapped value by accessing a mapping table;

accepting the map values as inputs;

determining an outcome for said one or more sets of data processing tasks; and transmitted in indicator of said outcome to said one or more participating components; wherein the first inputs and mapped values of the mapping table are programmably changeable to thus provide a high degree of flexibility with respect to said first inputs.

9. A method as claimed in claim 8, further characterized in that said inputs comprise requests by said one or more participating components to transmit a determined indicator of said outcome.

10. A method as claimed in claim 8, further characterized in that said inputs comprise:

commit requests; and rollback requests.

11. A method as claimed in claim 8, further characterized in that said step of determining comprises evaluating Boolean expressions.

12. A method as claimed in claim 8, further characterized in that said step of determining comprises accumulating counts.

13. A computer program product for processing one or more sets of data processing tasks, said computer program product comprising computer program instructions stored on a computer-readable storage medium for, when loaded into a computer and executed, causing a computer to carry out the steps of a method as claimed in claim 8.

* * * * *